United States Patent
Macciola et al.

(10) Patent No.: US 10,380,237 B2
(45) Date of Patent: Aug. 13, 2019

(54) SMART OPTICAL INPUT/OUTPUT (I/O) EXTENSION FOR CONTEXT-DEPENDENT WORKFLOWS

(71) Applicant: Kofax, Inc., Irvine, CA (US)

(72) Inventors: Anthony Macciola, Irvine, CA (US); Jan W. Amtrup, Silver Spring, MD (US)

(73) Assignee: KOFAX, INC., Irvine, CA (US)

( * ) Notice: Subject to any disclaimer, the term of this patent is extended or adjusted under 35 U.S.C. 154(b) by 58 days.

(21) Appl. No.: 15/672,215

(22) Filed: Aug. 8, 2017

(65) Prior Publication Data
US 2017/0337173 A1 Nov. 23, 2017

Related U.S. Application Data

(60) Continuation of application No. 15/134,318, filed on Apr. 20, 2016, now Pat. No. 9,747,269, which is a
(Continued)

(51) Int. Cl.
*G06F 17/24* (2006.01)
*G06K 9/00* (2006.01)
(Continued)

(52) U.S. Cl.
CPC .......... *G06F 17/243* (2013.01); *G06F 17/211* (2013.01); *G06F 17/276* (2013.01);
(Continued)

(58) Field of Classification Search
CPC .... G06K 9/00442; G06K 9/18; G06K 9/2018; G06K 2209/21; G06K 9/00469;
(Continued)

(56) References Cited

U.S. PATENT DOCUMENTS

| | | | |
|---|---|---|---|
| 6,658,389 B1 * | 12/2003 | Alpdemir | G06Q 30/02 704/270 |
| 8,768,712 B1 | 7/2014 | Sharifi | |

(Continued)

OTHER PUBLICATIONS

Notice of Allowance from U.S. Appl. No. 15/214,346, dated Dec. 11, 2017.
(Continued)

*Primary Examiner* — Gregory F Cunningham
(74) *Attorney, Agent, or Firm* — Zilka-Kotab, P.C.

(57) ABSTRACT

Systems, methods, and computer program products for smart, automated capture of textual information using optical sensors of a mobile device, and selective provision of such textual information to a user interface for facilitating performance of downstream workflows are disclosed. The capture and provision is context-aware, and determines context of the optical input, and optionally invokes a contextually-appropriate workflow based thereon. The techniques also provide capability to normalize, correct, and/or validate the captured optical input and provide the corrected, normalized, validated, etc. information to the contextually-appropriate workflow. As a result, the overall process of capturing information from optical input using a mobile device, invoking an appropriate workflow, and providing captured information to the workflow is significantly simplified and improved in terms of accuracy of data transfer/entry, speed and efficiency of workflows, and user experience.

20 Claims, 2 Drawing Sheets

Related U.S. Application Data division of application No. 14/686,644, filed on Apr. 14, 2015, now Pat. No. 9,349,046, which is a continuation-in-part of application No. 14/588,147, filed on Dec. 31, 2014, now Pat. No. 9,342,741, which is a continuation of application No. 14/176,006, filed on Feb. 7, 2014, now Pat. No. 8,958,605, which is a continuation-in-part of application No. 13/948,046, filed on Jul. 22, 2013, now Pat. No. 8,855,425, which is a continuation of application No. 13/691,610, filed on Nov. 30, 2012, now Pat. No. 8,526,739, which is a continuation of application No. 12/368,685, filed on Feb. 10, 2009, now Pat. No. 8,345,981.

(60) Provisional application No. 61/979,949, filed on Apr. 15, 2014.

(51) Int. Cl.
| | | |
|---|---|---|
| *G06K 9/18* | (2006.01) | |
| *G06Q 10/10* | (2012.01) | |
| *H04N 1/40* | (2006.01) | |
| *G06K 9/20* | (2006.01) | |
| *G06F 17/21* | (2006.01) | |
| *G06F 17/27* | (2006.01) | |

(52) U.S. Cl.
CPC ..... *G06K 9/00442* (2013.01); *G06K 9/00469* (2013.01); *G06K 9/18* (2013.01); *G06K 9/2018* (2013.01); *G06Q 10/10* (2013.01); *H04N 1/40* (2013.01); *G06K 2209/21* (2013.01)

(58) Field of Classification Search
CPC .... G06F 17/243; G06F 17/211; G06F 17/276; G06Q 10/10; H04N 1/40
USPC .......................................................... 382/229
See application file for complete search history.

(56) References Cited

U.S. PATENT DOCUMENTS

| | | |
|---|---|---|
| 9,946,985 B2 | 4/2018 | Macciola et al. |
| 2014/0184471 A1 | 7/2014 | Martynov et al. |
| 2016/0267230 A1 | 9/2016 | Ochs et al. |
| 2016/0364774 A1 | 12/2016 | Wittsiepe et al. |
| 2018/0189695 A1 | 7/2018 | Macciola et al. |

OTHER PUBLICATIONS

Mash, J., "The Best Google Now Voice Commands," Oct. 24, 2014,Chinavasion, Retrieved from Internet on Nov. 14, 2017, from https://blog.chinavasion.com/26071/the-best-google-now-voice-commands/.

Krause, K., "The best Android feature you're not using: voice commands", May 29, 2014, Phandroid, Retrieved from Internet on Nov. 14, 2017, from https://phandroid.com/2014/05/29/google-now-voice-commands/.

Macciola et al., U.S. Appl. No. 15/910,844, filed Mar. 2, 2018.

Examination Report from European Application No. 15779936.2, dated Jan. 31, 2018.

\* cited by examiner

SMART OPTICAL INPUT/OUTPUT (I/O) EXTENSION FOR CONTEXT-DEPENDENT WORKFLOWS

FIELD OF INVENTION

The present inventive disclosures relate to input/output (I/O) using optical component(s) of mobile devices. More specifically, the present concepts relate to integrating optical input functions of a mobile device into output functions of the mobile device, and even more specifically performing context-dependent integration of optical input from a mobile device camera into textual output for a mobile workflow or application.

BACKGROUND

Mobile devices occupy an increasingly prominent niche in the evolving marketplace, serving as access points at various stages of conducting a seemingly infinite number of activities. As this trend continues, mobile devices and mobile network capabilities provided thereby are leveraged in an increasing number and breadth of scenarios. Recent examples include the extension of mobile technology to provide a host of financial services such as check deposit, bill payment, account management, etc. In addition, location data gathered via mobile devices are utilized in an increasing number of applications, e.g. to provide targeted advertising, situational awareness, etc.

As the mobile development community finds new utility for devices, users are presented with more numerous, complex, and specific opportunities to provide input required by or advantageous to the underlying process the mobile device is utilized to perform. In addition, the context of the situations in which a user may interact with, or provide input to, a process continues diversifying.

This diversification naturally includes expansion into niches where the implemented technique may not necessarily be the most optimal or even an acceptable approach from the perspective of the user. In a culture where a fraction of a second determines the difference between an acceptable and unacceptable solution to a given challenge, developers seek every possible performance advantage to accomplish superior technology.

For example, several well-known inefficiencies exist with respect to user input received via a mobile device. A first inefficiency is small screen size typical to mobile devices, particularly mobile phones. Since the conventional "smartphone" excludes a physical keyboard and pointer device, relying instead on touchscreen technology, the amount of physical space allocated to a given key on a virtual "keyboard" displayed on the mobile device screen is much smaller than possible for a human finger to accurately and precisely invoke. As a result, typographical errors are common when considering textual user input received via a mobile device.

In order to combat this limitation, typical mobile devices employ powerful predictive analytics and dictionaries to "learn" a given user's input behavior. Based on the predictive model developed, the mobile device is capable of predicting the user's intended input text when the user's actual input corresponds to text that does not fit within defined norms, patterns, etc. The most visible example of utilizing such a predictive analysis and dictionary is embodied in conventional "autocorrect" functionality available with most typical mobile devices.

However, these "autocorrect" approaches are notorious in the mobile community for producing incorrect, or even inappropriate, predictions. While in some contexts these inaccuracies are humorous, the prevalence of erroneous predictions results in miscommunication and errors that frustrate the underlying process, the user, and ultimately defeat the adoption and utility of mobile devices in a wide variety of contexts to which a mobile device could be leveraged for great benefit.

As a result, some developers have turned to alternative sources of input, and techniques for gathering input via a mobile device. For example, most solutions have focused on utilizing audio input as an alternative or supplement to textual input (i.e. tactile input received via a virtual keyboard shown on the mobile device display). In practice, this technique has conventionally been embodied as an integration of voice recognition functionality of the mobile device (e.g. as conferred via a "virtual assistant" such as "Siri" on an APPLE mobile device (iOS 5.0 or higher)).

The illustrative embodiment of this audio input extension being added to a mobile keyboard is demonstrated in the figure depicted below. While this figure displays an interface generated using APPLE's iOS mobile operating system, similar functionality may be found on other platforms such as ANDROID, MICROSOFT SURFACE RT, etc. as well.

Audio input may be received via integrating an extension into the mobile virtual keyboard that facilitates the user providing input other than the typical tactile input received via the mobile device display. In one approach, the audio extension appears as a button depicting a microphone icon or symbol, immediately adjacent the space bar (at left). A user may interact with a field configured to accept textual input, e.g. a field on an online form, PDF, etc. The mobile device leverages the operating system to invoke the mobile virtual keyboard user interface in response to detecting the user's interaction with a field. The user then optionally provides tactile input to enter the desired text, or interacts with the audio extension to invoke an audio input interface. In the art, this technique is commonly known as "speech-to-text" functionality that accepts audio input and converts received audio input into textual information.

Upon invoking the audio input interface, and optionally in response to receiving additional input from the user via the mobile device display (e.g. tapping the audio extension a second time to indicate initiation of audio input), the user provides audio input, which is analyzed by the mobile device voice recognition component, converted into text and input into the field with which the user interacted to invoke the mobile virtual keyboard.

Via integration of audio input to the textual input/output capabilities of a mobile device, a user is enabled to input textual information in a hands-free approach that broadens the applicable utility of the device to a whole host of contexts otherwise not possible. For example, a user may generate a text message exclusively using audio input, according to these approaches. However, these approaches are also plagued by similarly-frustrating and performance-degrading inaccuracies and inconsistencies well known for existing voice recognition technology. As a result, current voice recognition approaches to supplementing or replacing textual input are unsatisfactory.

Voice recognition currently available is known for being subject to failure—often the voice recognition software is simply incapable of recognizing the unique vocalization exhibited by a particular individual. Similarly, voice recognition is prone to "audiographical" errors (i.e. errors analogous to "typographical" errors for audio input, such as falsely "recognizing" a vocalized word).

Furthermore, voice recognition is inherently limited by the existence of a predetermined set of rules (e.g. a set of assumptions or conditions that may be defined based on the language being spoken). Further still, since usage often differs significantly between spoken and written versions of the same language, it may not even be possible to utilize audio input as a supplement or alternative to textual input. For example, audio input is often an unworkable alternative to tactile input in circumstances where the expected form of expression and/or usage (which often define the "rules" upon which vocal recognition relies) correspond to the written form of a language.

Voice recognition is also an inferior tool to utilize for acquiring or validating user input corresponding to information not typically or capable of expression in words. The prototypical example of these limitations is demonstrable from the perspective of user input that includes symbols, such as often utilized to label units of measure. Even where these units of measure have commonly-accepted vocalizations (e.g. the unit of currency known as "U.S. dollars" corresponds to the symbol "$"), these vocalizations are not necessarily unique usages of the corresponding term (e.g. "pounds" may correspond to either a unit of measuring weight, i.e. "lbs." or a unit of currency, e.g. "£", depending on context).

Voice recognition is also unsuitable for receiving and processing textual input that includes grammatical symbols (e.g. one or more "symbols" used to convey grammatical information, such as a comma ",", semicolon ";" period "." and etc.) or formatting input, which includes symbols that do not necessarily have any corresponding physical representation in the language expressed (e.g. a carriage return, tab, space, particular text alignment, etc.).

Other existing approaches include the use of optical input as a supplement to textual input, but these techniques merely present the capability to combine textual input with an image or video clip, and distribute the combined input via a user's preferred form of communication (i.e. SMS text message, email, video chat, etc.). These conventional approaches typically include a combined input interface that facilitates receipt of tactile input via the mobile device virtual keyboard, and optical input via a separate button placed on the input interface (but not necessarily included in the virtual keyboard as is the case for audio input functionalities discussed above).

Upon the user interacting with this separate button, the device facilitates including previously-captured optical input or alternatively invoking a capture interface to capture new optical input and include the previously- or newly-captured optical input in addition to any textual information input by the user providing tactile input to the mobile virtual keyboard.

As a result of the foregoing, existing optical and audio input integration via mobile devices is severely limited as a supplemental or alternative approach to receiving and processing user input via the mobile device. Existing strategies allow cumbersome input of audio for voice recognition, or input of an image to supplement textual input. However, these techniques fail to integrate these various input capabilities in a context-sensitive manner that provides an intelligent alternative and/or supplement to textual input via a mobile device.

Ensuring the additional input capability is invoked in a productive manner that assists rather than degrades the performance of the device and the user's interactions therewith is a complex task, requiring careful consideration of various contexts in which optical input would be useful, and the appropriate conditions for capturing and/or analyzing the optical input to accomplish the context-sensitive benefits offered by intelligently integrating the mobile device camera as a source of input to receive textual information from the user.

Therefore, it would be highly beneficial to provide new methods, systems and/or computer program product technologies configured to supplement and/or replace tactile and auditory input as a mechanism for receiving user input and generating output, especially output that is determined in whole or in part based upon the received input and context of the situation in which input was received or the purpose for which the input is provided.

SUMMARY OF THE INVENTION

Figure 1:
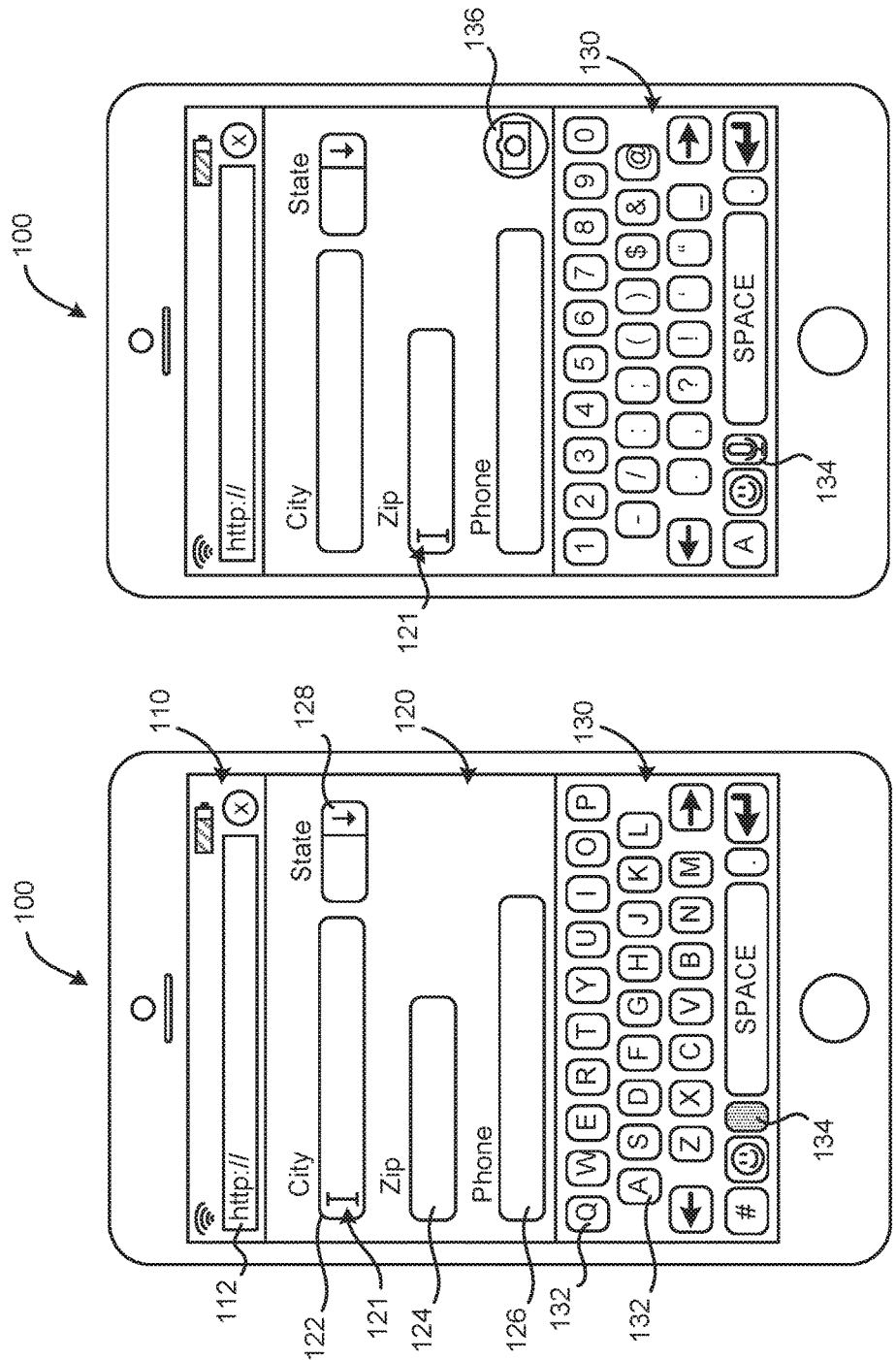
FIG. 1A illustrates a mobile device user interface configured to receive user input, in accordance with one embodiment.
FIG. 1B illustrates a mobile device user interface configured to receive user input, in accordance with one embodiment.

According to one embodiment, a computer-implemented method includes: receiving optical input via one or more optical sensors of a mobile device; analyzing the optical input using a processor of the mobile device to determine a context of the optical input; determining textual information from the captured optical input; and selectively providing the textual information to a user interface based on the context of the optical input.

According to another embodiment, a computer program product includes a computer readable medium having program code embodied therewith. The program code is executable by a mobile device to: analyze the optical input using a processor of the mobile device to determine a context of the optical input; determine textual information from the captured optical input; and selectively provide the textual information to a user interface based on the context of the optical input.

According to yet another embodiment, a computer program product includes a computer readable medium having program code embodied therewith. The program code is executable by a mobile device to: receive optical input via one or more optical sensors of a mobile device; analyze the optical input using the processor to determine a context of the optical input; and automatically invoke a contextually-appropriate workflow based on the context of the optical input.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The present application refers to image processing of images (e.g. pictures, figures, graphical schematics, single frames of movies, videos, films, clips, etc.) captured by cameras, especially cameras of mobile devices. As understood herein, a mobile device is any device capable of receiving data without having power supplied via a physical connection (e.g. wire, cord, cable, etc.) and capable of receiving data without a physical data connection (e.g. wire, cord, cable, etc.). Mobile devices within the scope of the present disclosures include exemplary devices such as a mobile telephone, smartphone, tablet, personal digital assistant, iPod®, iPad®, BLACKBERRY® device, etc.

Of course, the various embodiments set forth herein may be implemented utilizing hardware, software, or any desired combination thereof. For that matter, any type of logic may be utilized which is capable of implementing the various functionality set forth herein.

One benefit of using a mobile device is that with a data plan, image processing and information processing based on captured images can be done in a much more convenient, streamlined and integrated way than previous methods that relied on presence of a scanner. However, the use of mobile devices as document(s) capture and/or processing devices has heretofore been considered unfeasible for a variety of reasons.

In one approach, an image may be captured by a camera of a mobile device. The term "camera" should be broadly interpreted to include any type of device capable of capturing an image of a physical object external to the device, such as a piece of paper. The term "camera" does not encompass a peripheral scanner or multifunction device. Any type of camera may be used. Preferred embodiments may use cameras having a higher resolution, e.g. 8 MP or more, ideally 12 MP or more. The image may be captured in color, grayscale, black and white, or with any other known optical effect. The term "image" as referred to herein is meant to encompass any type of data corresponding to the output of the camera, including raw data, processed data, etc.

As discussed herein, the term "voice recognition" is to be considered equivalent to, or encompassing, the so-called "speech-to-text" functionality provided with some mobile devices (again, e.g. "Siri") that enables conversion of audio input to textual output. By contrast, the inventive techniques discussed herein may be referred to as "image-to-text" or "video-to-text" functionality.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, processor, or device.

A computer readable signal medium may include a propagated data signal with computer readable program code embodied therein, for example, in baseband, as part of a carrier wave, an electrical connection having one or more wires, an optical fiber, etc. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

An application may be installed on the mobile device, e.g., stored in a nonvolatile memory of the device. In one approach, the application includes instructions to perform processing of an image on the mobile device. In another approach, the application includes instructions to send the image to a remote server such as a network server. In yet another approach, the application may include instructions to decide whether to perform some or all processing on the mobile device and/or send the image to the remote site.

In one general embodiment, a method includes invoking a user input interface on a mobile device; invoking an optical input extension of the user input interface; capturing optical input via one or more optical sensors of the mobile device; determining textual information from the captured optical input; and providing the determined textual information to the user input interface.

In another general embodiment, a method includes receiving optical input via one or more optical sensors of a mobile device; analyzing the optical input using a processor of the mobile device to determine a context of the optical input; and automatically invoking a contextually-appropriate workflow based on the context of the optical input.

In yet another general embodiment, computer program product includes a computer readable storage medium having program code embodied therewith. The program code is readable/executable by a processor to: invoke a user input interface on a mobile device; invoke an optical input extension of the user input interface; capture optical input via one or more optical sensors of the mobile device; determine textual information from the captured optical input; and provide the determined textual information to the user input interface.

In various embodiments, the presently disclosed methods, systems and/or computer program products may optionally utilize and/or include any of the functionalities disclosed in related U.S. Pat. No. 8,855,375, filed Jan. 11, 2013, U.S. patent Ser. No. 13/948,046, filed Jul. 22, 2013; U.S. Patent Publication No. 2014/0270349, filed Mar. 13, 2013; U.S. Patent Publication No. 2014/0270536, Filed Mar. 13, 2014; U.S. Pat. No. 8,885,229, filed May 2, 2014; and/or U.S. patent application Ser. No. 14/220,029, filed Mar. 19, 2014. Each of the foregoing patent applications are herein incorporated by reference. For example, in several illustrative embodiments it may be advantageous to classify a document from which textual information is to be obtained, to perform data extraction on a document, to validate a document or information extracted from a document, to subject image data to additional processing (e.g. to improve image quality) before during or after the capture operation, etc. as would be understood by one having ordinary skill in the art upon reading the present descriptions.

Digital images suitable for processing according to the presently disclosed algorithms may be subjected to any image processing operations disclosed in the aforementioned patent application, such as page detection, rectangularization, detection of uneven illumination, illumination normalization, resolution estimation, blur detection, classification, data extraction, document validation, etc.

In more approaches, the presently disclosed methods, systems, and/or computer program products may be utilized with, implemented in, and/or include one or more user interfaces configured to facilitate performing any functionality disclosed herein and/or in the aforementioned related patent application, such as an image processing mobile application, a case management application, a classification application, and/or a data extraction application, in multiple embodiments.

In still more approaches, the presently disclosed systems, methods and/or computer program products may be advantageously applied to one or more of the use methodologies and/or scenarios disclosed in the aforementioned related patent application, among others that would be appreciated by one having ordinary skill in the art upon reading these descriptions.

It will further be appreciated that embodiments presented herein may be provided in the form of a service deployed on behalf of a customer to offer service on demand.

The presently disclosed inventive concepts concern the integration of optical input into the I/O capabilities of a mobile device in an intelligent manner that facilitates accurate and facile input of textual information. The exemplary scenarios in which these concepts will be most applicable include inputting textual information to a document, form, web page, etc. as would be understood by one having ordinary skill in the art upon reading the present specification. Beneficially, the presently disclosed techniques accomplish input of textual information without suffering from the inherent disadvantages of utilizing audio input (e.g. poor accuracy of voice recognition) or tactile input via a virtual mobile keyboard (e.g. inaccurate input due to small "key" size, improper "correction" using a predictive dictionary or "autocorrect" function, etc.).

Most notably, the present techniques provide superior performance and convenience to the user. Superior performance includes features such as improved accuracy and reduced input time (especially where the optical input depicts information suitable for use in multiple contexts or fields) of providing textual input via the mobile device. In part, the performance benefits are due to the inventive approach disclosed herein being configured to capture, analyze, and provide textual information from optical input without relying on tactile feedback from the user. As a result, these techniques are free from the disadvantages common to an input interface that utilizes a miniaturized virtual keyboard as described above.

Simultaneously, the present techniques offer superior performance over existing integrations of optical input for use in combination with textual input. For example, with reference to the conventional scenario described above involving composition and dispatch of a message including both textual input and optical input, the present techniques advantageously integrate the optical input capabilities of the mobile device with textual I/O such that a user need not provide tactile input to convey textual information.

Moreover, the optical input may be captured, analyzed and converted to textual information in a context-dependent manner. Context-dependent invocation, capture and analysis of optical input will be discussed in further detail below.

Optical Input Extension for Mobile Virtual Keyboard User Interface (UI)

The presently disclosed optical input functionality is provided via leveraging native tools, procedures, calls, components, libraries, etc. to capture optical input and tactile input according to the particular mobile operating system in which the functionality is included. In this manner, the present techniques represent a seamless integration of optical input to contexts typically limited to capturing textual information via either tactile or audio input.

This seamless integration presents advantages over existing optical and tactile input capture capabilities native to the mobile operating system, because those existing capabilities do not contemplate the use of optical input as an alternative or supplement to tactile input for the purposes of capturing and providing textual information.

Most noticeably, even though a conventional mobile operating system may provide independent optical input capture capabilities and tactile input capture capabilities, no currently-known technique exists to integrate optical input as a supplemental and/or alternative technique to receive, determine, and/or utilize textual information via a mobile device.

While rare, some mobile operating systems may further provide the capability to analyze captured image data and identify, locate, and/or interpret textual information depicted therein (e.g. via an optical character recognition (OCR) or other similar function as would be recognized by one having ordinary skill in the art). However, these rare embodiments do not present any integration of native OS capabilities that allow a user to leverage the combined power of optical input capture and analysis to effectively accomplish inputting textual information via capturing the optical input.

For example, no presently known technique enables a user to input textual information e.g. into a field of a form, directly by capturing optical input depicting identifiers comprising the desired textual information or other information that may be utilized to determine or obtain the desired textual information. "Other" information may include any type of information that would be understood by one having ordinary skill in the art upon reading the present descriptions as suitable or useful to obtain or determine the desired textual information.

In general, identifiers suitable for extraction in the context of the present optical input extension and context-sensitive invocation applications may include any type of identifying information (preferably textual information) which may be useful in the process of performing a business workflow such as an insurance claim or application; an accounts-payable process such as invoicing; a navigation process, a communications process, a tracking process, a financial transaction or workflow such as a tax return or account statement review; a browsing process; an admissions or customer on-boarding process, etc. as would be understood by a person having ordinary skill in the art upon reading the present descriptions. While suitable identifiers may generally include any type of identifying information suitable in processes such as the exemplary embodiments above, it should be understood that several types of information are particularly useful in select applications, e.g. unique identifiers that may be necessary to access a particular resource or complete a particular workflow.

Thus, in various embodiments the extracted identifier preferably comprises any one or more of a phone number, a complete or partial address, a universal resource locator (URL), a tracking number; a vehicle identification number (VIN), vehicle make/model and/or year, a social security number (SSN), a product name or code (such as a universal product code (UPC) or stock keeping unit (SKU)) or other similar textual information typically depicted on an invoice; an insurance group number and/or policy number, an insurance provider name, a person's name, a date (e.g. a date of birth or due date), a (preferably handwritten) signature, etc. as would be understood by one having ordinary skill in the art upon reading the present descriptions.

Similarly, "other information" may be obtained or determined using any suitable technique(s), including known technique(s) such as a lookup operation, reverse lookup, authentication, etc. as would be understood by one having ordinary skill in the art upon reading the present descriptions.

Rather, in order to accomplish this result using currently-available techniques, a user would need to perform a series of separate steps by manually invoking separate functions of the native OS (e.g. as described below with respect to the twelve-step conventional procedure required using current technology).

By "extension," the present disclosures refer to a functionality that is included in an otherwise-existing feature of the mobile device. Again with reference to the exemplary scenario of receiving audio input in conjunction with or instead of tactile input, the microphone "button" depicted in the figures above may be considered an audio extension of the mobile virtual keyboard user interface. In contrast, a standalone application, function, or feature that requires independent invocation by the user (e.g. invoking the application, function or feature without interacting with one of the standard user interfaces provided with the mobile operating system) is not to be considered an "extension" of existing capabilities.

In preferred embodiments, the optical input extension is configured to facilitate a user seamlessly navigating throughout plural fields presented via a user interface (e.g. a web page, application, form, field, etc.) in the course of capturing optical input. In some approaches, this functionality may be embodied as a "next" or "finished" button, gesture, symbol, option, etc. included with the optical input capture interface.

In practice, according to one illustrative scenario, a user may wish to capture data corresponding to textual information intended for input into a plurality of different fields of a form, web page, etc. In response to detecting the user's "focus" is on a data entry field (which may be a first data entry field among a plurality of such data entry fields present on the user interface), e.g. as indicated by clicking, tapping, hovering, selecting, tabbing, etc. to interact with the data entry field, the native user input/virtual keyboard interface including the optical input extension is invoked.

The user may interact with a first data entry field, invoke the optical input extension, e.g. by tapping a "camera" button displayed on the virtual keyboard. In response to invoking the optical input extension, the user may be presented with a capture interface comprising a "preview" of the optical input being captured. (e.g. substantially representing a "viewfinder" on a camera or other optical input device). Preferably, the "preview" and capture capabilities of the optical input extension may be utilized without switching the mobile device focus from the browser, application, etc. upon which the data entry field the user is interacting with is displayed.

Put another way, the optical input extension of the virtual keyboard interface described herein is preferably a seamless integration of functionalities that enables a user to locate data entry fields, invoke an optical input extension, capture optical input via the optical input extension, and populate the data entry field(s) with textual information determined from the captured optical input. Preferably, the entirety of the foregoing process is "seamless" in that the user may complete all constituent functionalities without needing to utilize, e.g. via a multitasking capability of the mobile device, or using a clipboard configured to "copy and paste" data between independent applications executable on the mobile device, etc. as would be understood by one having ordinary skill in the art upon reading the present descriptions.

In scenarios where the browser page, application, etc. with which the user is interacting includes multiple data entry fields, the user may preferably navigate between the multiple data entry fields utilizing an additional functionality provided via the optical input extension. In this manner, the user may selectively utilize the optical input extension to input textual information via capturing optical input for a desired subset of the total number of data fields presented. Similarly, the user may utilize the optical input extension to input textual information in any number of the multiple data entry fields sequentially.

Preferably, user navigation among multiple data entry fields is accomplished via a button or gesture with which the optical input interface is configured. Exemplary embodiments may employ, for example, a "next" and/or "previous" button, or be configured to interpret one or more swipe(s) or multi-touch gesture(s) to navigate among the multiple data entry fields. Even more preferably, the optical input interface also includes a functionality via which the user may terminate or otherwise indicate completion of the optical input capture process. For example, in some embodiments the optical input interface may include a "last" button, a "finished" or "done" button, etc. to enable the user to terminate the optical input capture process, and preferably to resume interaction with the browser page, application interface, etc.

Accordingly, in at least some embodiments, a critical functionality of the presently disclosed inventive concepts is that the optical input capability is integrated directly into an existing interface provided with the mobile operating system. The optical input capability is specifically integrated into the native virtual keyboard user interface provided with the mobile operating system as an extension of that virtual keyboard user interface.

The present techniques are therefore to be distinguished from approaches that might seek to ineffectively "stitch" together existing capabilities such as conveyed via separate (i.e. not integrated) mobile device camera and virtual keyboard user interface components. For example, techniques that simply leverage a combination of tactile input and optical input as received via entirely separate interfaces, functions, applications, etc. complicate, rather than facilitate, ease and accuracy of input.

For instance, a standalone application or function configured to capture optical input and analyze that optical input to determine the presence of textual information (and optionally to determine and/or output the depicted text) is incapable of performing such capture and/or analysis of the optical input in a context-dependent manner. For example, the standalone application, function, feature, etc. is not configured to yield desired textual information in the context of a particular field or form displayed, for example, on a website the standalone application, function, feature, etc. is not configured to render in the first place.

As a result, a user would have to invoke several independent processes, and engage in the full course of conduct required by each. For example, without the presently disclosed integration of optical input and tactile input, a user attempting a similar process using conventional technology would need to engage in an overly-cumbersome and significantly inferior process involving separate operations performed using multiple independent processes individually installed, configured, invoked and operated by the user.

The exemplary conventional process referred to above proceeds substantially as follows:

(1) invoke a mobile web browser application (e.g. Safari for iOS);
(2) navigate to a web page requiring textual information, using the mobile device web browser
(3) close or suspend the mobile browser application;
(4) invoke a separate optical input functionality (e.g. a "camera" application);
(5) capture optical input including desired textual information via the separate optical input application;
(6) close or suspend the optical input application;
(7) invoke a separate optical analysis application (e.g. an OCR application);
(8) analyze captured optical input to determine textual information depicted therein using the separately optical analysis application;
(7) locate the desired textual information from among the determined textual information;
(8) select the desired textual information from among the determined textual information (or equivalently deselect, delete, or otherwise discard any undesired textual information);
(9) copy the desired textual information (e.g. to a mobile device "clipboard" or equivalently simply via the user memorizing the desired textual information); and
(10) close or suspend the optical analysis application;
(11) invoke or resume the closed/suspended web browser application (if the web browser was closed rather than suspended, navigating to the web page as in step (2) above must also be repeated); and

(12) paste (or otherwise reproduce) the desired textual information in an appropriate field of the web page from step (2), above.

The foregoing scenario involving use of multiple independent processes may not even be possible, e.g. if a particular mobile device does not support the requisite multitasking capabilities or has insufficient system resources to effectively "switch" between independent applications required to accomplish the desired result.

Figure 2:
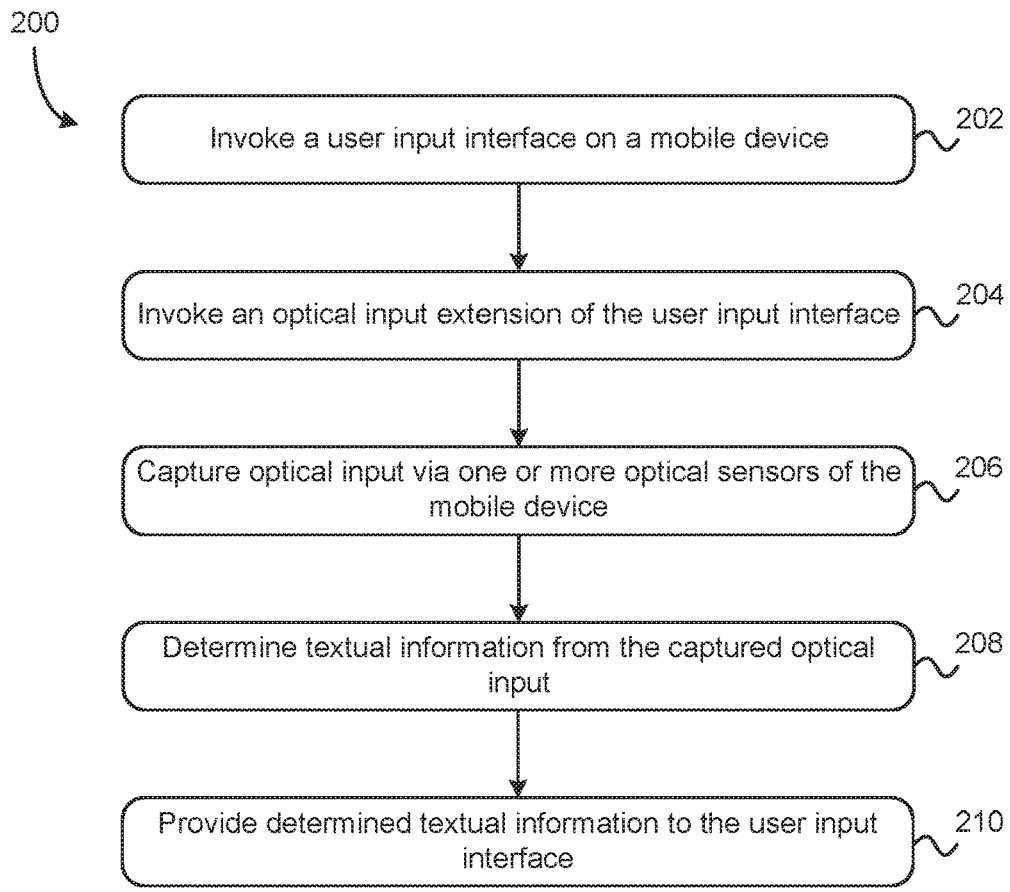
FIG. 2 is a flowchart of a method, according to one embodiment.

For comparison, an exemplary process utilizing an integrated optical input and tactile input functionality via an optical input extension to a virtual keyboard user interface would be substantially more efficient (both with respect to consumption of system resources as well as from the perspective of the user's convenience and time, as illustrated according to one embodiment in method 200 of FIG. 2.

Method 200 may be performed in any suitable environment, including those depicted in FIGS. 1A-1B, and any other suitable environment that would be appreciated by a person having ordinary skill in the art upon reading the present descriptions.

In operation 202, a user input user interface (UI) is invoked on a mobile device.

In operation 204, an optical input extension of the user input UI is invoked.

In operation 206, optical input is captured via one or more optical sensors of the mobile device.

In operation 208, textual information is determined from the captured optical input.

In operation 210, determined textual information is provided to the user input UI.

Method 200 may include any one or more additional or alternative features as disclosed herein. In various approaches, method 200 may additionally and/or alternatively include functionality such as selective identification, normalization, validation, and provision of textual information from the optical input to the user input UI.

The user input interface is preferably invoked in response to detecting a user interaction with an user interface element configured to receive textual information. In such approaches, the method may advantageously include analyzing the optical input to determine the textual information. Accordingly, the analyzing may include one or more of performing optical character recognition (OCR); identifying desired textual information among the determined textual information based on the OCR; and selectively providing the desired textual information to the user input interface.

Preferably, the desired textual information includes a plurality of identifiers, and each identifier corresponds to one of a plurality of user interface elements configured to receive textual information. In some embodiments, some or all of the identifiers include textual information required by one of the user interface elements. Thus, it is advantageous to determine which of the identifiers include such required textual information and selectively provide each corresponding identifier to the appropriate user interface element, preferably in the proper format.

It is highly beneficial to the overall user experience to provide functionality for automatically correcting OCR errors, e.g. to ensure accurate reproduction of captured content, and ensure proper formatting of the information in the manner expected by the workflow. Therefore, it is advantageous in some approaches for the method to include one or more of validating and normalizing at least one of the identifiers to conform with one or more of an expected format of the desired textual information and an expected range of values for the desired textual information.

Validation, in various approaches, may include determining one or more of reference content from a complementary document and business rules applicable to at least one of the identifiers. This determination is preferably based on the element corresponding to the identifier(s), and the validating is based on one or more of the reference content and the business rules. Similarly, normalization may include determining formatting from a complementary document, business rules, and/or the element invoked by the user.

In more embodiments, the method may also include one or more of validating (i.e. checking for accuracy of content and/or format, e.g. against reference content) and normalizing (i.e. modifying format or presentation to match expected format or other business rules, etc.) the desired textual information to conform with either or both of an expected format of the desired textual information and an expected range of values for the desired textual information. This facilitates correcting OCR errors to ensure accurate reproduction of captured content and proper formatting of the information in the manner expected by the workflow. In some embodiments, the validating and the normalizing are based on one or more of reference content from a complementary document and business rules. Thus, the method may also include determining one or more of the complementary document and the business rules based on the element with which the user interacted.

In some approaches, the optical input extension is presented simultaneous to presenting the invoked user input interface. Preferably, the user input interface comprises a virtual keyboard displayed on the mobile device, which includes a camera button displayed on the virtual keyboard.

The method may additionally and/or alternatively include automatically invoking an optical input capture interface in response to detecting the invocation of the optical input extension.

In various embodiments, the method may additionally and/or alternatively include preanalyzing the optical input prior to capturing the optical input. Preanalyzing includes operations such as: detecting an object depicted in the optical input; determining one or more characteristics of the object depicted in the optical input; and determining one or more analysis parameters based at least in part on the determined characteristic(s). The one or more analysis parameters preferably include OCR parameters.

While the foregoing examples are set forth with reference to a user interacting with a mobile browser, those having ordinary skill in the art will appreciate that in principle the presently disclosed inventive concepts are applicable to any user interaction with any data entry field, whether presented via a mobile browser, mobile device operating system functionality, third party application, native OS application, etc. in various embodiments.

As demonstrated according to the exemplary scenario above, the presently disclosed techniques can reduce the number of individual actions required to accomplish a superior result by a factor of at least two. When considering the additional advantages discussed below with respect to context-dependent invocation, capture and analysis of optical input, skilled artisans will appreciate the significant benefits conferred by the inventive techniques discussed herein as opposed to utilizing conventional techniques that may be capable of accomplishing one or more constituent actions described in the present disclosures but are absolutely incapable of conveying the performance advantages achieved by integrating these functionalities into a unified procedure with superior capabilities and performance characteristics.

Context-Dependent Invocation, Capture and Analysis of Optical Input

In preferred approaches, the presently disclosed inventive optical input techniques may leverage contextual information concerning the optical or textual information, the data input operation; the form, field, or etc. into which the data are to be input; etc. as would be understood by one having ordinary skill in the art upon reading the present descriptions.

It may be especially advantageous to capture textual information of a certain type using optical input as opposed to textual input. Contextually-advantageous selection of optical input as the preferred form of input data may include preferentially capturing optical input wherever conventional tactile or audio input would be problematic.

For example, where textual information does not follow any established convention or set of rules (e.g. as typically utilized by a predictive dictionary) then attempting to input the textual information via tactile or audio input (e.g. "typing" on the mobile device virtual keyboard interface, reading or reciting the textual information, etc.) is error-prone. The predictive dictionary or vocal recognition functionality may improperly "correct" or interpret the input provided by the user in an attempt to enforce one or more of the inapplicable conventions or rules.

In more embodiments, optical input may be preferred where a large volume and/or complex collection of textual information is required. For instance, if a user engaging in an activity via their mobile device wishes to complete a form having several fields requesting different types of textual information, and some or all of the textual information are depicted on one or more documents, then it may be advantageous to determine or obtain the textual information via capturing optical input comprising an image of the document depicting that textual information, rather than requiring the user to manually input each individual piece of the desired textual information.

Similarly, it may be advantageous to analyze optical input according to the context thereof. For example, in one approach a user may utilize a document as a source of textual information to be provided via optical input. The document may take any form, and may exhibit unique characteristics that are indicative of the document belonging to a predetermined class of documents (e.g. a credit card, credit report, driver's license, financial statement, tax form, etc. as would be understood by one having ordinary skill in the art upon reading the present descriptions). Further still, due in whole or in part to these unique characteristics, it may be advantageous to analyze optical input depicting documents belonging to the predetermined class using predetermined analysis parameters, settings, techniques, assumptions, etc. that are known to yield ideal analytical results for that class of document.

For example, it may be advantageous to analyze optical input using predetermined settings known to yield particularly preferable results for documents depicting textual information having a particular color profile, a background having a particular color profile, especially if such color profile is a non-standard (e.g. not black-and-white) color profile.

Similarly, if a document class is characterized by known dimensions, a known orientation, a known layout or organization of the textual information, etc. it may be advantageous to utilize analysis parameters, settings, etc. configured to produce superior analytical results for that layout, organization, orientation, etc.

In addition, it may be advantageous to utilize unique analysis parameters configured to analyze textual information represented in a particular font or style, e.g. utilizing known characteristics of that font such as average character width, height, expected dimensions for each possible character, etc. as would be understood by one having ordinary skill in the art upon reading the present disclosures.

In various embodiments, the predetermined analysis parameters, settings, techniques, etc. employed preferably include one or more OCR parameters, settings, techniques, etc.

Accordingly, it may be even more preferable in some scenarios to include functionality configured to perform pre-analysis of the optical input presented to the mobile device optical sensor(s) prior to capturing the optical input. For example, in preferred embodiments upon invoking a capture interface (whether automatically, in response to user input dictating invocation of the capture interface, or otherwise) the mobile device may determine characteristics of the optical input, including but not limited to whether the optical input comprises an identifiable object or object(s), and ideally an identity or classification of any such detected object(s). Based on the determination reached by this pre-analysis, predetermined capture settings known to yield ideal optical input for subsequent analysis may be employed.

In more approaches, the optical input may be analyzed based on contextual information determined from or based on the web page, application, form, field, etc. with which the user interacts to invoke the user input interface (e.g. virtual keyboard and/or optical input extension(s) thereof, in various embodiments). For example, and as will be appreciated by skilled artisans, existing techniques allow a user interface to restrict input a user may provide to the user interface, e.g. by selectively invoking a restricted input interface (e.g. an interface consisting of numerical characters for inputting a date of birth or social security number, an interface consisting of alphabetic characters for inputting a "name", etc.).

In a similar manner, the presently described optical input extension may influence, determine, or restrict the analytical parameters employed to analyze optical input captured using the extension. In the exemplary scenario where analysis includes optical character recognition, for instance, analytical parameters employed for a field accepting only numerical characters may include an OCR alphabet that is restricted to numerals, or conversely to an OCR alphabet restricted to letters for a field accepting only alphabetic characters. In preferred approaches, the optical input extension may automatically and transparently define the analytical parameters based on the type, format, etc. of acceptable input for a given data entry field, and the defining may be performed directly in response to receiving instructions identifying a type of acceptable input for the particular field upon the user interacting with the data entry field. To illustrate, in a scenario where, for example, a user interacts with a fillable data entry field expecting a telephone number as input. Whereas according to the conventional example the user interacting with this data entry field is presented with a keyboard consisting of numerals 0-9, according to the presently disclosed inventive concepts a user interacting with the same data entry field and utilizing an optical input extension as described herein may employ analytical parameters including an OCR alphabet being limited to numerals 0-9.

In the illustrative scenario according to the foregoing embodiments, a user may navigate to a web page, form, mobile application, etc. using a mobile device. The user may interact with one or more fillable fields presented on the web page, a navigation bar of the web browser, or any other element of the medium with which the user is interacting that accepts textual information as suitable input. In response to detecting this interaction, and/or in response to input from the user, the mobile device may invoke an optical capture interface substantially representing a "camera" application, e.g. as typically included in native OS functionality provided with conventional mobile devices.

Upon invoking the optical capture interface, the mobile device display represents a "viewfinder" depicting the mobile device optical sensor's field of view, preferably in real- or near-real time. The mobile device, either in response to user input or (preferably) in an automatic manner transparent to the user, may perform pre-analysis as described above utilizing optical input received by the mobile device optical sensor(s) (e.g. the optical input utilized to generate the viewfinder display).

In particularly preferred approaches, the pre-analysis may include identifying any textual information depicted in a portion of the optical sensor's field of view (e.g. a bounding box) and displaying a preview of any identified textual information. Even more preferably, identified text may be displayed in the data entry field with which the user interacted to invoke the user input interface and/or optical input extension thereof.

In more approaches, the presently disclosed methods, systems, and/or computer program products may be utilized with, implemented in, and/or include one or more user interfaces (UIs) configured to facilitate receiving user input and producing corresponding output. The user input UI(s) may be in the form of a standard UI included with a mobile device operating system, such as a keyboard interface as employed with standard SMS messaging functionality and applications, browser applications, etc.; a number pad interface such as employed with standard telephony functionality and applications, or any other standard operating system UI configured to receive user input, particularly input comprising or corresponding to textual information (i.e. user input comprising taps on various locations of a screen or speech which will be converted to textual information).

For instance, and as shown in FIG. 1A, user input UI 100 includes a navigation UI 110, a form or page 120, and a keyboard UI 130. Each UI 110, 120, 130 may be standard UIs provided via a mobile device operating system, standard browser or mobile application included with the mobile device operating system, or may be provided via a separately installed, standalone application. Standalone application embodiments are preferred due to the ability to efficiently integrate context-dependent functionality and capture/extraction functionality in a seamless workflow and user experience.

With continuing reference to FIG. 1A, in the context of the present application a workflow facilitated via the user input UI 100, the navigation UI 110 includes a navigation component 112 such as an address bar of a mobile browser, forward and/or back buttons (not shown) to assist navigating through various stages of the workflow, etc. as would be understood by one having ordinary skill in the art upon reading the present descriptions.

Form/Page 120 of the workflow includes a plurality of fields 122-128 which are preferably configured to receive as input a plurality of identifiers (optionally normalized and/or validated as described herein) output from a capture and extraction operation of the workflow. As shown in FIG. 1A, the fields include a City field 122, a Zip Code field 124, a Phone Number field 126 and a State field 128. Of course, additional fields may be included in the form/page 120 and the user may navigate around the form/page 120 to selectively display the various fields thereof using any suitable technique that would be appreciated by a person having ordinary skill in the art upon reading the present descriptions.

Moreover, each field may be associated with an expected format and/or value or range of values for textual information received as input thereto. For example, City field 122 may expect a string of alphabetic characters beginning with a capital letter and followed by a plurality of lowercase letters, optionally including one or more spaces or hyphen characters but excluding numerals and other special characters. Conversely, Zip Code field 124 may expect a string of either five numerals or ten characters including numerals and an optional hyphen or space. Zip Code field 124 may further expect the ten-character string to obey a particular format, such as "#####-####". Similarly, Phone Number field 126 may expect seven numerals and optionally one or more spaces, parenthesis, periods, commas, and/or hyphens. Phone number field 126 may also expect the textual information input therein to obey a mask corresponding to one of several standard phone number formats, such as "(XXX) ###-####" in the United States, or other corresponding known conventions depending on the locality in which the device is being used. State field 128 may expect a two-character string of capital letters. Of course, other fields may be similarly associated with expected format(s) and/or value(s) or ranges of values according to known conventions, standards, etc. associated with information intended for receipt as input thereto.

A user may interact with one of the fields 122-128 using any suitable means, e.g. via tapping on a region of the mobile device display corresponding to the field, and in response the keyboard interface 130 may be invoked. Alternatively, keyboard interface may not be invoked if the field does not accept user-defined textual information, e.g. in the case of a drop-down menu field such as State field 128. For fields which do accept user-defined textual information, a user's interaction with the field may be indicated by presence of a cursor 121. The user's interaction with a particular field may also invoke or schedule a context-dependent component of the workflow, e.g. a component configured to apply particular business rules, perform validation, document classification, etc. as described in further detail herein.

The keyboard interface 130 may selectively include alphabetic character set (e.g. as shown in FIG. 1A in response to user interaction with City field 122) or a numerical/symbolic character set (e.g. as shown in FIG. 1B in response to user interaction with Zip Code field 124), based on the context of the field interacted with by the user (e.g. the expected value or value range of textual information input to the field). Preferably, keyboard interface 130 includes a plurality of keys 132 configured to facilitate the user "typing" textual information into the fields, as well as a function button 134 configured to execute one or more operations using an I/O component of the mobile device, such as a microphone and/or camera of the mobile device.

Upon invoking keyboard interface 130, and as represented in FIG. 1A, a function button 134 of the keyboard interface 130 (e.g. a button commonly associated with a voice capture or speech-to-text function, as shown in FIG. 1B) may be interacted with by the user to invoke an optical input extension of the mobile application or workflow. In practice, the optical input extension invokes a capture interface and initiates a capture and extraction operation (optionally including validation, classification, etc.) as described in further detail below.

Additionally and/or alternatively, the optical input extension may be displayed separately from the keyboard interface 130, e.g. as a separate button 136 within form/page 120 as depicted generally in FIG. 1B.

In one approach, an image of a document may be captured or received by the mobile device, and an image processing operation such as optical character recognition (OCR) may be performed on the image. In more approaches, a user hovers the mobile device over a document and identifiers are extracted via OCR directly from the video feed without requiring a separately invoked capture operation. Based in whole or in part on the OCR results, an identifier, and preferably a unique identifier, may be extracted from the image.

Normalization, Validation

The extracted identifier may be compared with reference content or analyzed in view of one or more business rules. The reference content and/or business rules are preferably stored locally on the mobile device to facilitate efficient comparison and/or analysis, and may be provided in any suitable form.

In myriad approaches, reference content may take the form of a complementary document to the document from which the identifier is to be extracted. Complementary documents may include a document, file, or any other suitable source of textual information against which a simple comparison of the extracted identifier may be performed. For example, in a preferred approach a mobile application includes a data store having one or more complementary documents therein, each complementary document corresponding to at least one identifier or type of identifier utilized in one or more workflows of the mobile application.

The complementary document may comprise identifiers, e.g. as may be obtained and stored in the data store based on previous capture and extraction operations using the mobile application. Advantageously, the complementary document may comprise a processed image of a document depicting the identifier, said processing being configured to improve the quality of the image for purposes of data extraction (e.g. via custom binarization based on color profile, correction of projective effects, orientation correction, etc.). The document image may serve as a validation tool to ensure accuracy of an identifier extracted from a document imaged in subsequent invocations of the mobile application or particular workflows therein. Of course, similar functionality may be achieved when the complementary document comprises simply a validated identifier, e.g. a string of characters, symbols, of an identifier that are known to be accurate.

In additional and/or alternative embodiments, business rules may indicate an expected format of the extracted identifier, and may further include rules regarding how to selectively extract the identifier (e.g. using OCR parameters based on a particular color profile of the document, OCR parameters that restrict a location within the document for which the identifier is searched), and/or modify the extracted identifier to fit the expected format, for example using a mask, a regular expression, modifying OCR parameters such as via changing an OCR alphabet to exclude certain symbols or character sets, etc. as would be understood by a person having ordinary skill in the art upon reading the present descriptions.

In one approach, business rules may indicate that only a portion of information properly considered an identifier within the scope of the present disclosures is needed or desired in the context of a particular workflow. For instance, a workflow may require only a zip code of an address, only the last four digits of a social security number or credit card number, only a month and year of a date, only a portion of a line item on an invoice, such as a price or product code but not both, etc. as would be understood by a person having ordinary skill in the art upon reading the present descriptions.

A particularly advantage of utilizing business rules with the presently disclosed inventive concepts is that the particular business rule applied to a particular extraction operation may be context sensitive and thus automatically determine appropriate business rules to apply to an extraction attempt.

To account for, and automatically correct, OCR errors, in some approaches the extracted identifier may be corrected. For instance, preferably the extracted identifier is corrected using the textual information from the complementary document and/or predefined business rules.

Predefined business rules, in this context, may preferably include business-oriented criteria/conditions for processing data, such as setting a threshold for the acceptable amount of mismatch to which correction may be applied (e.g. correction may be applied to mismatches of less than a maximum threshold number of characters, a maximum percentage of characters, etc., corrections may only be applied to mismatches fitting within a predefined set of "acceptable" errors e.g. a number "1" instead of a letter "1" and vise-versa, including dash(es) "-" instead of hyphen(s) "-", etc.) and other similar business-oriented criteria/conditions as would be understood by one having ordinary skill in the art upon reading the present descriptions.

Additionally and/or alternatively, an extracted identifier may be modified. For example, discrepancies arising from OCR errors may be automatically handled using the present techniques. In one embodiment, according to business rules, an identifier is expected to be in a predetermined format. For instance, in the context of a tender document such as a credit card, the identifier may be an account number expected in a 16-digit numerical format substantially fitting "####-####-####-####" as seen typically on conventional credit/debit cards, or an expiration date in a "MM/YY" format, etc. as would be understood by one having ordinary skill in the art upon reading the present descriptions.

In more embodiments, the extracted identifier may be accurately extracted, but nonetheless be presented in a different format than expected (e.g. the identifier may include or exclude expected symbols or formatting, such as spaces, dashes, or impermissible characters (e.g. a month designation in a date, such as "Jan" or "January" including alphabetic characters where the expected format is strictly numerical, such as "01").

Discrepancies of this nature may be automatically resolved by leveraging data normalization functionalities. For example, in some approaches where an extracted identifier comprises a date, there are a finite set of suitable formats in which the date data may be expressed, such as 1 January, 2001; Jan. 1, 2001, 01/01/01, Jan. 1, 01, etc. as would be understood by one having ordinary skill in the art upon reading the present descriptions. Other types of identifier data may similarly be expressed in a finite number of formats, including account number (e.g. conventional 16-digit account numbers in the format ####-####-####-####, #### #### #### ####, ################, etc.), cardholder name (e.g. Last, First; Last, First, Middle Initial (MI); First Last; First MI. Last; etc.), security code (e.g. either a three-digit or four-digit number, an alphanumeric string including both letters and numbers, etc.), etc. as would be understood by one having ordinary skill in the art upon reading the present descriptions.

Based on business rules defining an expected format or finite set of possible formats for the identifier data, the presently disclosed techniques may be configured to automatically normalize data obtained (e.g. via extraction) from the imaged financial document in a manner that the data obtained from the financial document matches an expected format of corresponding data, e.g. contained/depicted in textual information of the complementary document. For example, upon determining that extracted data such as a date is in a particular format (e.g. Jan. 1, 2001) other than an expected format (e.g. MM/YY), it is advantageous to convert the extracted data from the particular format to the expected format, enabling facile and accurate matching between the identifier data derived from the image and the corresponding textual information from the complementary document.

In other instances, it may be advantageous to utilize an iterative approach to achieve data normalization. For example, in one embodiment a first iteration operates substantially as described above—extracting an identifier from an image of a document and comparing the extracted identifier to corresponding data from one or more data sources (e.g. the textual information from the complementary document, database record, the predefined business rules, etc.). However, the first iteration comparison fails to yield any match between the extracted identifier and the corresponding data from the data source(s). In some approaches, the mismatches may be a result of OCR errors rather than true mismatch between the identifier on the imaged document and the corresponding data from the one or more data sources.

OCR errors of this nature may be corrected, in some approaches, by determining one or more characteristics of data corresponding to the identifier. In one embodiment, the first OCR iteration may extract the identifier in an unacceptable format (e.g. the data is not properly normalized) and/or perform the OCR in a manner such that the extracted identifier contains one or more OCR errors. As a result, the extracted identifier fails to match any corresponding data in the one or more data sources, despite the fact that the "true" identifier as depicted on the document actually matches at least some of the corresponding data. False negative results of this variety may be mitigated or avoided by modifying parameters, rules and/or assumptions underlying the OCR operation based on identifier characteristics.

For example, in one embodiment an identifier is extracted, and compared to corresponding data from one or more data sources. The string of characters comprising the extracted identifier does not match any account number in the corresponding data. In response to failing to identify any corresponding data in the data sources, the extracted identifier is further analyzed to determine characteristics thereof.

In one approach, the extracted identifier may be compared to a plurality of predefined identifier types (e.g. "First Name," "Last Name," "Account Number," "expiration date," "PIN," etc.) to determine whether the extracted identifier exhibits any characteristic(s) corresponding to one of the predefined identifier types. For example, the extracted identifier and the predefined identifier types may be compared to determine the existence of any similarities with respect to data formatting and/or data values.

Exemplary identifier characteristics suitable for such comparison, in some approaches include string length, string alphabet, (i.e. the set of characters from which the identifier may be formed, such as "alphabetic," "numeral," "alphanumeric," etc.), presence of one or more discernable pattern(s) common to identifiers of a particular type, or any other characteristic that would be recognized by a skilled artisan reading these descriptions. In a preferred approach, identifier characteristics may include any pattern recognizable using known pattern-matching tools, for example regular expressions.

Additionally and/or alternatively, the identifier type may be determined in whole or in part based on one or more document characteristics, such as: a location in the document from which the identifier is extracted; a classification of the document from which the identifier is extracted (such as disclosed in related U.S. patent application Ser. No. 13/802,226, filed Mar. 13, 2013, published as U.S. Patent Publication No. 2014/0270349 on Sep. 18, 2014, and herein incorporated by reference); and/or characteristic(s) of data located adjacent, above, below, or otherwise spatially proximate to the identifier on the document, etc. as would be understood by skilled artisans upon reading the instant descriptions. For example, in a preferred embodiment identifier characteristics may be determined based on a location from which an identifier is extracted being located below data depicting related information, such as an identifier being located below a street address line, which typically corresponds to a city, state, and/or zip code, particularly in documents depicting a mailing address. In another preferred embodiment, identifier characteristic(s) may be determined based on an identifier being extracted from a location horizontally adjacent to related data, for example as is the case for an expiration date or account number, respectively, as depicted on typical credit and debit card documents.

In one illustrative approach, an extracted identifier is analyzed, and determined to have characteristics of a "payment amount" identifier type. In particular, the extracted identifier: exhibits one or more of the characteristic "payment amount" string length (e.g. six characters); string alphabet (e.g. letters, numerals, and currency symbols); and/or pattern (e.g. a currency symbol character such as "$", "£", or "€" followed by two numeral characters, a decimal or period symbol "." and two additional numeral characters, e.g. "$19.99" "£10.00" or "€01.23", etc.) In other approaches, the identifier may be determined exhibit characteristics such as consisting of characters expressed only in numerical digits, such a street or room number of an address, etc.

Upon determining the identifier characteristics, the extracted identifier may be analyzed to determine whether any convention(s) or rule(s) describing the identifier characteristics are violated, which may be indicative of the extracted identifier including OCR errors, improper data normalization, or both, in various approaches. In one example, an extracted identifier fails to match any of the corresponding data in the one or more data sources based on a first comparison therebetween. In response to the matching failure, the extracted identifier is analyzed and determined to be of an identifier type "account number," based at least in part on the extracted string being sixteen characters in length. The extracted identifier is further analyzed and determined to violate an "account number" characteristic. The analysis reveals that while account number strings consist of numeral characters, the extracted identifier includes a non-numeral character, e.g. because one character in the extracted identifier string was improperly determined to be a letter "B" instead of a numeral "8," a letter "1" instead of a numeral "1", a letter "O" instead of a numeral "0," etc. as would be understood by one having ordinary skill in the art upon reading the present descriptions.

The OCR error may be corrected using a second OCR iteration based at least in part upon establishing the identifier characteristic(s). In the foregoing example of an account number erroneously including an alphabetic character instead of a numeral, the OCR engine may be restricted to an alphabet of candidate characters consisting entirely of numerical digits. The decision to restrict the OCR alphabet, in turn, is based on predefined business rules applying to the format of the account number, i.e. that the account number consists of numerical digits. The second iteration, accordingly, properly recognizes the "8" numeral in the identifier, rather than the "B" letter erroneously determined from the first iteration. Preferably, the identifier complies with at least one business rule, such as described above. More preferably, the business rule(s) may be expressed as at least one logical expression (e.g. a rule, formula, a pattern, convention, structure, organization, etc. or any number or combination thereof).

Those having ordinary skill in the art will appreciate that similar business rules may inform an OCR process regarding how to define the extracted identifier string in a variety of situations differing from the numeral/character distinction exemplified above.

For example, in one embodiment a business rule may indicate that a particular alphabet of symbols should be used, e.g. as opposed to a more complete or different alphabet of symbols. The business rule indicates an account number follows a convention including hyphen symbol characters, i.e. "-", but excludes dash symbol characters (i.e. "-"), underscore symbol characters (i.e. "_") and space characters (i.e. " "). Accordingly, if a first iteration does not successfully extract an identifier matching corresponding data, e.g. in the complementary document, a second iteration may be performed using a more restricted alphabet to normalize the extraction results according to the expectations reflected in the business rule(s).

Exemplary Context-Dependent Workflow Use Cases

For example, a user working within a mobile application or workflow may interact with a field of the application, a webpage, etc. and based on the particular field, a unique business rule may be applied to a subsequent capture and extraction task. For example, a field requesting a ZIP code (e.g. field 124 of FIG. 1A) may indicate or invoke a business rule where the extracted identifier should have a format of five (or nine) digits, all characters should be numerical (or include hyphens), and alphabetic characters adjacent to a five (or nine) number string should not be included in the extracted identifier. Thus, the user's interaction with the particular field can provide context-sensitive determination of the proper business rule to apply in a subsequent capture and extraction of an identifier from a document.

In this manner, a user could selectively capture only the ZIP code from a document depicting a full street address, and populate the ZIP code field of the corresponding mobile application or workflow, all without providing any instruction to the mobile application or workflow and without having to input any textual information to the field.

Similarly, business rules may be based partially or entirely on context of the document in view of the mobile application or workflow. For example, in a similar situation as described immediately above a user may interact with a field of a form or web page expecting a ZIP code. However, the form or page also includes other fields requesting different information, such as a phone number, city and state of an address, name, social security number, expiration date, credit card number, etc. The fact that the field with which the user interacted is part of a form/page requesting other information that is likely to be on a single document (e.g. a driver's license, utility bill, credit card, etc.) may invoke a business rule whereby a subsequent capture and extraction operation attempts to extract multiple identifiers and populate multiple fields of the form in a single process, even though the user may not have interacted with the other fields. To be clear, this constitutes the context of the workflow as in the example above rather than context of the document.

To determine document context, upon invoking the capture interface a document within the viewfinder may be analyzed to determine the type of document, in one approach. Based on this determination the multiple identifier extraction and field population process may be performed (e.g. if the document type is a type of document likely to contain multiple identifiers corresponding to the multiple fields) or circumvented (e.g. if the document is not an appropriate type of document to attempt multi-extraction because the document type typically does not depict information corresponding to the other fields on the form/page).

In this manner, it is possible to leverage context of both the mobile application/workflow, e.g. as indicated by the user's interaction with a field, as well as the context of the document from which the identifier is being extracted. Advantageously, this dual-context approach enables an optical input-based autofill functionality without relying on any prior data entry. Autofill can be performed on first capture in a near-real time.

In a preferred approach, a user may capture an image of one or more documents. The image is preferably captured using a capture component (e.g. "camera" as described above) of a mobile device by invoking the capture interface via an optical I/O extension (e.g. extension 134 or 136 of FIGS. 1A and 1B, respectively). The captured image may be optionally stored to a memory, e.g. a memory of the mobile device, for future use and/or re-use as described herein. Notably, other embodiments of the present disclosures also encapsulate scenarios where a document image is not captured, but otherwise received at a device (preferably a device having a processor, such as a mobile device) for subsequent use in extracting and/or validating information depicted on or associated with the document (e.g. a corresponding identifier depicted on a different document).

The image of the document is analyzed by performing OCR thereon. The OCR may be utilized substantially as described above to identify and/or extract characters, and particularly text characters, from the image. Even more preferably, the extracted characters include an identifier that uniquely identifies the document. The identifier may take any suitable form known in the art, and in some approaches may be embodied as an alphanumeric string of characters, e.g. a tender document account number (such as a 16-digit account number typically associated with credit/debit card accounts), a security code (such as a CCV code on a debit/credit card, a scratch-off validation code, a personal identification number (PIN), etc.) an expiration date (e.g. in the format "MM/YY"), etc. as would be understood by one having ordinary skill in the art upon reading the present descriptions.

The presently disclosed techniques may leverage a number of advantageous features to provide a document owner with useful information and/or services regarding their document. For example, and optionally taking into account contextual information such as a mobile application running on the mobile device, data may be automatically provided to the mobile application without requiring the user to input any textual information, thus avoiding time consuming processes, user error, predictive dictionary bias, and other problems common to conventional, user-based textual input for mobile devices.

For instance, in one embodiment a mobile application, which may be a standard browser displaying a particular web page, a standalone application, etc., includes a workflow configured to facilitate a user applying for automobile insurance. The workflow may include fields requesting information such as the applicant's name, driver license number, vehicle make, model, and/or year, state of residence, etc.

Based on a user invoking one of the fields of the mobile application, and/or based on the user invoking an optical input extension (e.g. extension 134 as shown in FIG. 1A or extension 136 as shown in FIG. 1B) of a keyboard or other user input interface (e.g. UIs 110, 120, 130 as shown in FIG. 1A) displayed via the mobile device, a capture interface such as a viewfinder is invoked on the mobile device.

The capture interface may include a prompt directing a user to capture image(s) of one or more documents, e.g. a driver license and vehicle registration, depicting some or all of the information requested for the fields of the workflow. Preferably, the capture interface is configured to automatically detect a document depicted in the viewfinder, and capture an image thereof when optimal capture conditions (e.g. illumination, perspective, and zoom/resolution) have been achieved. The viewfinder may include a reticle, such as four corners arranged in a rectangular fashion to facilitate capturing an image of the entire document, a rectangular box to facilitate capturing a line, field, etc. of textual information depicted on the document, etc. as would be understood by a person having ordinary skill in the art upon reading the present descriptions. The reticle is preferably configured to assist a user in orienting the device and/or document to achieve optimal capture conditions.

More preferably, the capture operation is contextually aware to facilitate accurate and precise extraction of identifiers from the document, as well as accurate and precise output of corresponding textual information in the fields of the workflow. The corresponding textual information may be identical to the extracted identifier(s), or may be normalized according to an expected format and/or to correct OCR errors, in various approaches. In more approaches, the identifiers may be validated against reference content or business rules as described in further detail herein, to facilitate precise, accurate extraction and output.

In some approaches, the document may be analyzed and classified to determine the context of the document and/or determine whether to attempt a multi-field extraction operation, as described further herein.

Context-Sensitive Process Invocation

In more embodiments, it would be advantageous to automatically invoke one or more contextually-appropriate processes based on optical input received via the mobile device optical sensors.

Figure 3:
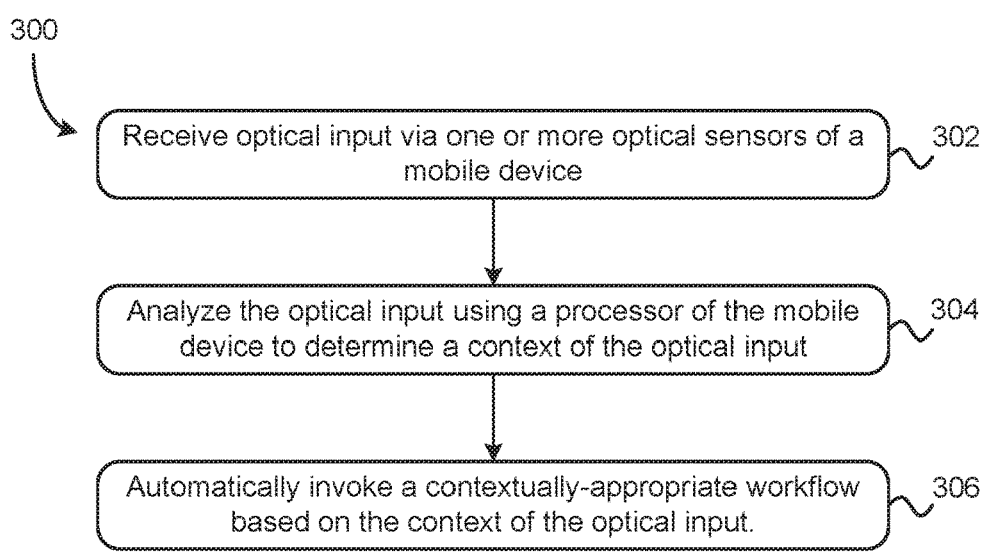
FIG. 3 is a flowchart of a method, according to one embodiment.

In general, such a process may be represented graphically as shown in FIG. 3, method 300, according to multiple embodiments. Method 300 may be performed in any suitable environment, including those shown in FIGS. 1A-1B, and any other suitable environment that would be appreciated by a person having ordinary skill in the art upon reading the present descriptions.

As shown in FIG. 3, method 300 includes operations 302-306. In operation 302, optical input is received via one or more optical sensors of a mobile device, such as occurs when a viewfinder interface is invoked and a video feed depicting the field of view of the mobile device optical sensor(s) is displayed.

In operation 304, the optical input is analyzed using a processor of the mobile device to determine a context of the optical input.

In operation 306, a contextually-appropriate workflow is invoked based on the context of the optical input.

The context may include any suitable information relevant to performing operations within the corresponding workflow, and preferably comprises one or more of: a type of document represented in the optical input; and content of the document represented in the optical input.

Where the context includes the document type, preferably the type of document is selected from a group consisting of: a contract, a tender document, an identity document, an insurance document, a title, a quote, and a vehicle registration. Where context includes document content, preferably the content is selected from: a phone number, a social security number, a signature, a line item of an invoice, a partial or complete address, a universal resource locator, an insurance group number, a credit card number, a tracking number, a photograph, and a distribution of fields depicted on the document.

In one approach, a user may position a document depicting a signature, such as a driver's license, personal or business check, contract, etc. within range of the mobile device's optical sensors. The mobile device may detect the presence of the signature, preferably in conjunction with one or more other identifying characteristics (e.g. a photograph on the driver's license, a particular font such as magnetic ink character recognition fonts on a check, a distribution of fields on a form, etc.) of the document and automatically or semi-automatically invoke an appropriate mobile application on the mobile device. Additionally and/or alternatively, within a particular mobile application a context-dependent business process or workflow may similarly be invoked.

Different information may indicate the proper workflow to invoke is either an insurance quote, a health care admission process, a signing ceremony, a deposit, or any combination thereof. A driver license number and vehicle identification number may indicate propriety of an automobile insurance quote. A health insurance provider name, policyholder (patient name) and/or group number may indicate propriety of the health care admission workflow or a health insurance quote workflow, alternatively. A document containing textual information common to a loan agreement such as a mortgage or loan application, in conjunction with a signature or signature block may indicate propriety of a signing ceremony workflow. A document including a signature and account number or deposit amount may indicate propriety of a deposit workflow. Of course, the presently disclosed inventive concepts may be applied to other workflows as would be understood by a person having ordinary skill in the art upon reading the present disclosure, without departing from the scope of the instant descriptions.

For example, in response to detecting the signature and the photograph, a mobile application may invoke an insurance quote workflow to facilitate a user obtaining automobile insurance. In response to detecting the signature and particular font, a mobile check deposit workflow may be invoked. In response to detecting the signature and the distribution of fields, a mortgage application process or document signing ceremony process may be invoked. Similarly, if not already operating from within a mobile application, the mobile device may invoke an application configured to facilitate the contextually-appropriate action such as described above, in various embodiments.

Other examples of context-sensitive process invocation may include any one or more of the following. In response to detecting a document depicted in view of the mobile device optical sensors is an invoice (e.g. by detecting presence of the word "invoice," an invoice number, a known service-provider entity name, address, etc.), invoking a systems, applications, products (SAP) or other similar enterprise application and automatically displaying a status of the invoice.

In response to detecting textual information depicted in view of the mobile device optical sensors is a phone number, a phone application of the mobile device operating system may be invoked, and the number may be automatically entered and/or dialed.

In response to detecting textual information depicted in view of the mobile device optical sensors is a universal resource locator, a web browser application of the mobile device may be invoked, and the URL may be entered into the navigation or address bar, and/or the browser may automatically direct to resources indicated by the URL.

In response to detecting textual information depicted in view of the mobile device optical sensors is a credit card number, a financial services application or credit card company website may be invoked (via a browser in cases where a website is invoked) and a credit account statement, balance, due date, etc. may be displayed to the user.

In response to detecting textual information depicted in view of the mobile device optical sensors is a social security number, a tax preparation application or website may be invoked.

Of course, as would be understood by those having ordinary skill in the art upon reading the present descriptions, the inventive concepts disclosed herein may be employed to any suitable scenario, implementation, application, etc. that involves the use of optical input as a source of textual information. In particularly preferred approaches, a user input UI of a workflow may be contextually invoked based on optical input in the mobile device's field of view, and any appropriate information also within the mobile device field of view is automatically captured and output into an appropriate field of the invoked UI with appropriate formatting and any OCR errors already corrected.

While several exemplary scenarios have been set forth above to illustrate the concepts and features of the inventive subject matter disclosed herein, those having ordinary skill in the art will appreciate that these concepts are equally applicable to any number of similar scenarios, implementations, practical applications, etc. For instance, while some examples described herein may have been presented from the perspective of a user interacting with a web page and desiring to input textual information depicted on a document into a fillable field of that web page, the inventive subject matter discussed above is equally applicable to any similar or equivalent scenario that would be appreciated by skilled artisans reading these disclosures. For example, the present subject matter may be equally applied to any situation involving a user inputting textual information via a virtual keyboard user interface, such as a user composing an email, interacting with an application, etc.

While the present descriptions have been made with primary reference to methods, one having ordinary skill in the art will appreciate that the inventive concepts described herein may be equally implemented in or as a system and/or computer program product.

For example, a system within the scope of the present descriptions may include a processor and logic in and/or executable by the processor to cause the processor to perform steps of a method as described herein.

Similarly, a computer program product within the scope of the present descriptions may a computer readable storage medium having program code embodied therewith, the program code readable/executable by a processor to cause the processor to perform steps of a method as described herein.

While various embodiments have been described above, it should be understood that they have been presented by way of example only, and not limitation. For instance, any equivalent of an embodiment disclosed herein that would be appreciated by a person having ordinary skill in the art upon reading these disclosures should be understood as included within the scope of the inventive concepts described herein. Similarly, these inventive disclosures may be combined in any suitable manner, permutation, synthesis, modification, etc. thereof that would be appreciated by a person having ordinary skill in the art upon reading these descriptions.

Thus, the breadth and scope of an embodiment of the present invention should not be limited by any of the above-described exemplary embodiments, but should be defined only in accordance with the following claims and their equivalents.

What is claimed is:

1. A computer-implemented method, comprising:
receiving optical input via one or more optical sensors of a mobile device;
analyzing the optical input using a processor of the mobile device to determine a context of the optical input;
determining textual information from the optical input; and
selectively providing the textual information to a user interface based on the context of the optical input.

2. The method as recited in claim 1, further comprising: automatically invoking a contextually-appropriate workflow based on the context of the optical input.

3. The method as recited in claim 2, wherein the workflow comprises:
a telecommunications application or function;
an insurance quote;
a health care admission process;
a signing ceremony; and/or
a financial services application configured to facilitate:
displaying at least one of an account statement, an account balance, and a payment due date;
processing a deposit;
preparing a tax return; and/or
processing a loan application.

4. The method as recited in claim 1, further comprising either or both of:
correcting OCR errors in the textual information prior to selectively providing the textual information to the user interface; and
normalizing a format of the textual information prior to selectively providing the textual information to the user interface.

5. The method as recited in claim 1, wherein the context comprises either or both of:
a type of document represented in the optical input; and
a content of the document represented in the optical input.

6. The method as recited in claim 5, wherein the type of document is selected from the group consisting of: a contract, a tender document, an identity document, an insurance document, a title, a quote, and a vehicle registration.

7. The method as recited in claim 5, wherein the content is selected from the group consisting of: a driver license number, a vehicle identification number, a phone number, a social security number, a signature, a line item of an invoice, a partial or complete address, a universal resource locator, an insurance group number, a credit card number, a tracking number, a photograph, and a distribution of fields depicted on the document.

8. A computer program product comprising: a non-transitory computer readable storage medium having program code embodied therewith, the program code readable/executable by a mobile device to:
- receive optical input via one or more optical sensors of a mobile device;
- analyze the optical input using a processor of the mobile device to determine a context of the optical input;
- determine textual information from the optical input; and
- selectively provide the textual information to a user interface based on the context of the optical input.

9. The computer program product as recited in claim 8, further comprising program code readable/executable by the mobile device to: automatically invoke a contextually-appropriate workflow based on the context of the optical input.

10. The computer program product as recited in claim 9, wherein the workflow comprises:
- a telecommunications application or function;
- an insurance quote;
- a health care admission process;
- a signing ceremony; and/or
- a financial services application configured to facilitate one or more of:
  - displaying at least one of an account statement, an account balance, and a payment due date;
  - processing a deposit;
  - preparing a tax return; and/or
  - processing a loan application.

11. The computer program product as recited in claim 8, further program code readable/executable by the mobile device to perform either or both of:
- correcting OCR errors in the textual information prior to selectively providing the textual information to the user interface; and
- normalizing a format of the textual information prior to selectively providing the textual information to the user interface.

12. The computer program product as recited in claim 8, wherein the context comprises either or both of:
- a type of document represented in the optical input; and
- a content of the document represented in the optical input.

13. The computer program product as recited in claim 12, wherein the type of document is selected from the group consisting of: a contract, a tender document, an identity document, an insurance document, a title, a quote, and a vehicle registration.

14. The computer program product as recited in claim 12, wherein the content is selected from the group consisting of: a driver license number, a vehicle identification number, a phone number, a social security number, a signature, a line item of an invoice, a partial or complete address, a universal resource locator, an insurance group number, a credit card number, a tracking number, a photograph, and a distribution of fields depicted on the document.

15. A computer program product comprising: a non-transitory computer readable storage medium having program code embodied therewith, the program code readable/executable by a mobile device to:
- receive optical input via one or more optical sensors of the mobile device;
- analyze the optical input using a processor of the mobile device to determine a context of the optical input; and
- automatically invoke a contextually-appropriate workflow based on the context of the optical input.

16. The computer program product as recited in claim 15, further comprising program code readable/executable by the mobile device to perform one or more either or both of:
- correcting OCR errors in the optical input and providing the corrected optical input to the contextually-appropriate workflow; and
- normalizing a format of the optical input and providing the normalized optical input to the contextually-appropriate workflow.

17. The computer program product as recited in claim 15, wherein the context comprises either or both of:
- a type of document represented in the optical input; and
- a content of the document represented in the optical input.

18. The computer program product as recited in claim 17, wherein the type of document is selected from a group consisting of: a contract, a tender document, an identity document, an insurance document, a title, a quote, and a vehicle registration.

19. The computer program product as recited in claim 17, wherein the content is selected from the group consisting of: a driver license number, a vehicle identification number, a phone number, a social security number, a signature, a line item of an invoice, a partial or complete address, a universal resource locator, an insurance group number, a credit card number, a tracking number, a photograph, and a distribution of fields depicted on the document.

20. The computer program product as recited in claim 15, wherein the workflow comprises:
- a telecommunications application or function;
- an insurance quote;
- a health care admission process;
- a signing ceremony; and/or
- a financial services application configured to facilitate:
  - displaying at least one of an account statement, an account balance, and a payment due date;
  - processing a deposit;
  - preparing a tax return; and/or
  - processing a loan application.

* * * * *